United States Patent [19]
De Coi

[11] Patent Number: 6,124,586
[45] Date of Patent: Sep. 26, 2000

[54] METHOD OF ALIGNING A LIGHT CURTAIN

[75] Inventor: Beat De Coi, Sargans, Switzerland

[73] Assignee: Cedes AG, Landquart, Switzerland

[21] Appl. No.: 09/109,304

[22] Filed: Jun. 30, 1998

[30] Foreign Application Priority Data

Jun. 30, 1997 [EP] European Pat. Off. .............. 97810416

[51] Int. Cl.$^7$ ............................... C01V 9/04; G06M 7/00
[52] U.S. Cl. ........................................ 250/221; 340/556
[58] Field of Search ................................ 250/221, 222.2; 340/555, 556, 557

[56] References Cited

U.S. PATENT DOCUMENTS

| | | |
|---|---|---|
| 3,752,978 | 8/1973 | Kahl et al. . |
| 4,650,990 | 3/1987 | Jönnson . |
| 5,302,942 | 4/1994 | Blau . |
| 5,393,973 | 2/1995 | Blau ........................................ 250/221 |
| 5,486,691 | 1/1996 | Dieterie ................................... 250/221 |
| 5,983,373 | 11/1999 | Lea ......................................... 714/712 |

*Primary Examiner*—Stephone B. Allen
*Attorney, Agent, or Firm*—Frishauf, Holtz, Goodman, Langer & Chick, P.C.

[57] ABSTRACT

To properly align support elements (17,19), typically support bars or strips of a light curtain formed by a plurality of light beams (21), transmitted between transmitters (13) and receivers (15) on the respective support bars (17,19), a separate alignment light source, typically a laser (29), is provided. The laser (29) projects a light beam (33) to a receiver (35) from one (17) of said bars to the other (19). A counter-directed beam (33') is projected from the other (19) of the bars to the first bar (17). The counter-directed beam (33') spaced from the first direct beam (33), can be generated by a second laser (29'), or by deflecting the received direct beam (33) on or in the second bar (19) by 180° to provide the counter-directed return beam to the first bar (17). This permits rapid alignment of the respective bars, even with respect to five directions of freedom of movement of the respective bars. Preferably, the laser is pulsed at a frequency between 1 and 5 Hz, and a timing circuit is provided to disconnect the laser or lasers after suitable alignment timing intervals, or after a safety interval, so that the lifetime of the laser or lasers will be commensurate with the lifetime of the radiation transmitters (13) and receivers (15) of the light curtain itself.

17 Claims, 8 Drawing Sheets

METHOD OF ALIGNING A LIGHT CURTAIN

Reference to related patents, the disclosures of which are hereby incorporated by reference:
U.S. Pat. No. 3,752,978, Kahl et al
U.S. Pat. No. 4,650,990, Jönsson
U.S. Pat. No. 5,302,942, Blau
U.S. Pat. No. 5,393,973, Blau

FIELD OF INVENTION

The present invention relates to a method to geometrically align spaced light curtain elements, and to such light curtain elements which incorporate alignment devices which permit easy and effective alignment of the elements with respect to each other. The respective elements have light transmitters and receivers, typically arranged in rows of support bars.

BACKGROUND

It is known to utilize lasers as an assistance element in combination with light curtains, light gates, and light screens. The lasers can be applied either to the transmitter or the receiver strip of the screens or curtains. One known arrangement is powered by batteries and, at a distance of about 5 m, generates a light spot having a diameter of less than 10 mm. This alignment assistance device can be shifted along the strip on which the light gate bar is mounted, so that the parallel relationship of the transmitter strip and the receiver strip can be tested over the entire height of the supervised, or guard field, that is, the field subject to light between the receiver and the transmitter. This assistance device has a disadvantage, in that it is available only during the time that the strips are adjusted. The adjustment, further, cannot test at the same time for all the possible degrees of movement of the strips with respect to each other, nor can it test the mechanical relative adjustment. Once the light curtain, after adjustment, is installed, subsequent testing of the relative alignment of the receiver and transmitter strip is frequently difficult, or impossible because the bars may not be generally readily accessible. The necessary space to add the alignment devices also frequently is not available. If the alignment device is shifted along the respective receiver or transmitter strip, the receiving and transmitting functions of the light curtain must be disconnected.

U.S. Pat. No. 3,752,978, Kahl et al., describes a photo-electric intrusion detector in form of a light gate, which has an infrared transmitter and a respective receiver. Transmitter and receivers are located on respective separate attachment or support bars. To reduce the constructional depth of the light gate, a mirror is provided in each of the respective strips, which deflects a testing beam at a right angle. To initially adjust the mirror, a separate light source having visible light is used, which can be secured to the strips. The alignment of one mirror on one strip is so carried out that the light source on the other, opposite strip is mounted ahead of the other mirror, and the first mirror is so adjusted until the light beam of the light source impinges on the transmitter, or the receiver, respectively. This adjustment system, in which a working beam is adjusted between the transmitter and the receiver during installation cannot be used with a light curtain which has a multiplicity of transmitting units and receivers to provide a supervised screen or curtain, rather than for only a single beam.

Integrating an alignment assistance device with the strips or bars which retain the transmitters and receivers generally has been considered to be undesirable, because alignment can be done only at one point. In actual practice, the first mentioned alignment assistance device which can test the protected field over its entire extent is preferred, although this device is not integral with the light curtain itself. It is, further, well known that the laser sources which are generally available on the market have a substantially shorter lifetime than the optoelectronic elements used to provide the light curtain itself, and to check the integrity of the light curtain. If the alignment assistance device were to be permanently in operation during the lifetime of the optoelectronic elements, it would have to be replaced much more frequently than the optoelectronic elements themselves. Thus, integration of laser alignment devices into light gates has been generally, found to be, undesirable.

U.S. Pat. No. 5,302,942, Blau, describes a light curtain in which each receiver is coupled with a light emitting diode (LED) radiating visible light. If a receiver element received a signal a below a predetermined threshold, the diode lights, so that the operator can readily check the condition of the supervised, or guard zone. According to this disclosure, the LEDs can also be used for respective alignment of the transmitter and receiver strips or bars, by so aligning the bars with respect to each other that all LEDs respond. The disadvantage of such adjustment, however, is that only correct alignment of the transmitter bar with respect to the receiver bar can be tested, but not reasons for possible misalignment.

THE INVENTION

It is an object of the present invention to provide a method which permits relative mutual geometric alignment of two spaced oppositely positioned transmitters, transmitter and receiver bars, and further, to provide a light curtain system with an alignment device which permits to rapidly and reliably match the receiver bar and the transmitter bar with respect to each other in appropriate alignment. Both the method and the device should permit adjustment in several degrees of freedom of movement, and supervision of the respective adjustment in continuous operation, while permitting readjustment of the respective alignment without difficulty and substantial expenditure of time.

Briefly, two respectively counter-directed alignment radiation beams are generated, in which the respective radiation beams extend between the support strips or support bars for a plurality of radiation transmitting transmitters and receivers, respectively, so that the respective radiation transmitter and receiver bars also function as support elements for the alignment radiation beam generating, and receiving devices. The respective counter-directed beams are detected, and alignment is then carried out for optimum light reception by the receivers upon appropriate alignment of the respective receiver and transmitter bars.

By utilizing two, or also more than two respectively oppositely directed beams, which are spaced from each other, a determination can readily be made whether the transmitter and receiver beams are coaxial with respect to each other, or not.

The two respectively counter-directed beams can be derived by two separate light sources, or, alternatively, they can be generated by a single light source, the light from which then is deflected and reflected in the opposite direction, 180° reversed by suitable mirrors, prisms, or the like.

The alignment beam can be activated as desired and since the respective light generators and receivers are integrated in the respective receiver and transmitter bars, the alignment of these bars can be checked at any time.

In accordance with a preferred feature of the invention, the light sources which generate the alignment radiation beams, as well as alignment radiation receivers detecting the alignment radiation beams, are located on predetermined positions, in a predetermined alignment on the respective radiation transmitting support elements and the radiation receiving support elements, that is, typically elongated ribs for support bars. Thus, for installation, locating the support bars relatively to each other can be readily and quickly carried out by placing the respective strips or bars in such a position that the transmitted alignment radiation beams impinge on the corresponding alignment radiation beam receivers. This, simultaneously, provides for optimal alignment and matching of the positions of the cooperating receiver and transmitter pairs. The bars or strips, thus, are optimally preadjusted, such that the optical axis of the alignment light source meets the center of the alignment radiation receiver, or detector. Preferably, at least one light source is provided to generate the alignment radiation beams, located on each one of the two strips or bars, or integrated therewith. The strips or bars can be formed as flat, for example extruded strips, or shaped bars, and, simultaneously, form the attachment supports, for example plates, for the transmitter and receiver elements, respectively, of the light curtain, as well as for the alignment radiation beam transmitter and receiver, respectively.

To align the respective receiver and transmitter support strips or bars, it is possible to sequentially energize the alignment radiation beam transmitters and receivers, so that the beams from the alignment radiation transmitters meet the respective alignment radiation receivers. Preferably, however, both alignment radiation beams are operated simultaneously. Thus, positional adjustment made on one of the strips can immediately indicate if the desired matching of positions of the two strips has been achieved, and the match can be immediately seen. Thus, alignment of two spaced strips, which then will provide the light curtain or light screen, can be done very rapidly. The alignment radiation beams can operate continuously, or in a continuously pulsed mode. They may be modulated laser beams within the visible range, and thus vibrations and misalignments can readily be seen. Vibrations and misalignments will appear as Lissajou figures, for example located with respect to cross hairs on one, or both of the receivers. Analyzing the Lissajou figures also permits forming a judgment regarding the intensity of vibrations, and in which direction they act. Thus, alignment can be made for optimal effect.

It has been found particularly desirable to pulse the light source, typically a laser, with a frequency between about 1 and 5 Hz, preferably between about 2 to 4 Hz. The light spots generated by the alignment radiation transmitter can thus be easily seen, even under daylight or bright ambient light is conditions.

In accordance with a feature of the invention, the present invention provides a light curtain or light screen system in which an alignment assistance arrangement is integrated. In accordance with one embodiment, at least one light source is located on a first strip or bar to generate a first alignment radiation beam. The second strip or bar, located remote from the first one and between which bars the radiation screen or curtain is to become effective, has deflection elements to deflect the first radiation beam and to generate a second radiation beam in opposite direction, located spaced from the first radiation beam, for example, at the opposite end of the radiation receiver strip or bar. The deflection device, to deflect the transmitted alignment radiation beam by 180° may be mirrors, prisms, or the like, as well known. In accordance with a second embodiment of the invention, each one of the light curtain strips or bars has a first and second light source, respectively, located on the first and second strip or bar, to generate two oppositely directed, spaced alignment radiation beams.

The deflection elements, mirrors, prisms, or similarly operating optical elements, are integrated in one of the strips or bars, if the first embodiment of the invention is used. The light source, preferably, is a laser operating in the visible range and generating either a continuous light beam, during alignment operation or, pulsed, or modulated beams. Thus, light sources which provide pulsed or modulated light are also suitable. One, or all light sources are, preferably, integrated in the respective strip or bar. This has the advantage that the adjustment of the alignment radiation sources with respect to the strips or bars, and the light curtain transmitters and receivers located thereon, can be done already at the factory supplying the light curtain system. The alignment radiation sources can then be energized, as desired, to carry out the alignment, and then disconnected. Since they are integrated with the strips or bars, they are always available for readjustment or realignment, if such should be necessary.

In a particularly preferred embodiment, one of the strips or bars has at least two laser light sources; the opposite strip or bar has at least one laser light source. All the lasers are integrated, physically, on the strips or bars. This arrangement has the substantial advantage that torsions or twists within the protected field can also be determined.

In accordance with another preferred embodiment, the alignment detection and indicating elements may include crosshairs, or other markers. In a simple case, alignment of the strips or bars can be carried out, based on the impingement point at the front side of the strip, for example with respect to a predetermined distance to the next positioned receiver. Basically, the detection elements for the alignment radiation beams can be photosensors, and optimal alignment can then be determined by measuring the intensity of the light received by the photosensors. Preferably, the respective strip or bar has a switch, for example a touch-sensitive switch or key to energize the alignment radiation system for operation. This switch, particularly if more than one light source is used, can simultaneously energize the respective alignment radiation light sources, or separate switches can be used. In normal operation of the light curtain, the alignment radiation sources are not in operation. The switches can be coupled to suitable timers which automatically disconnect the alignment radiation sources after predetermined intervals.

DRAWINGS

Figure 3:
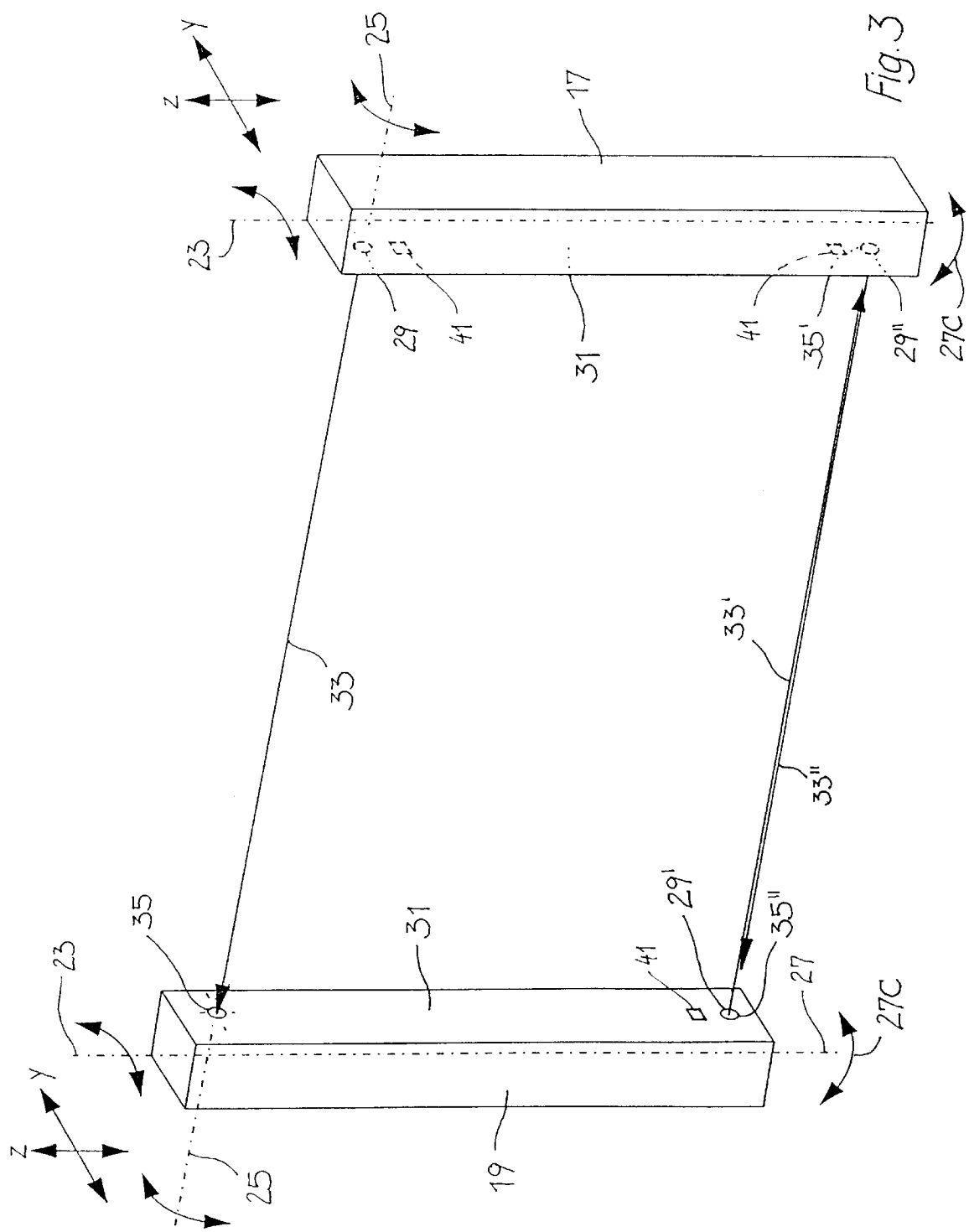
Figure 4:
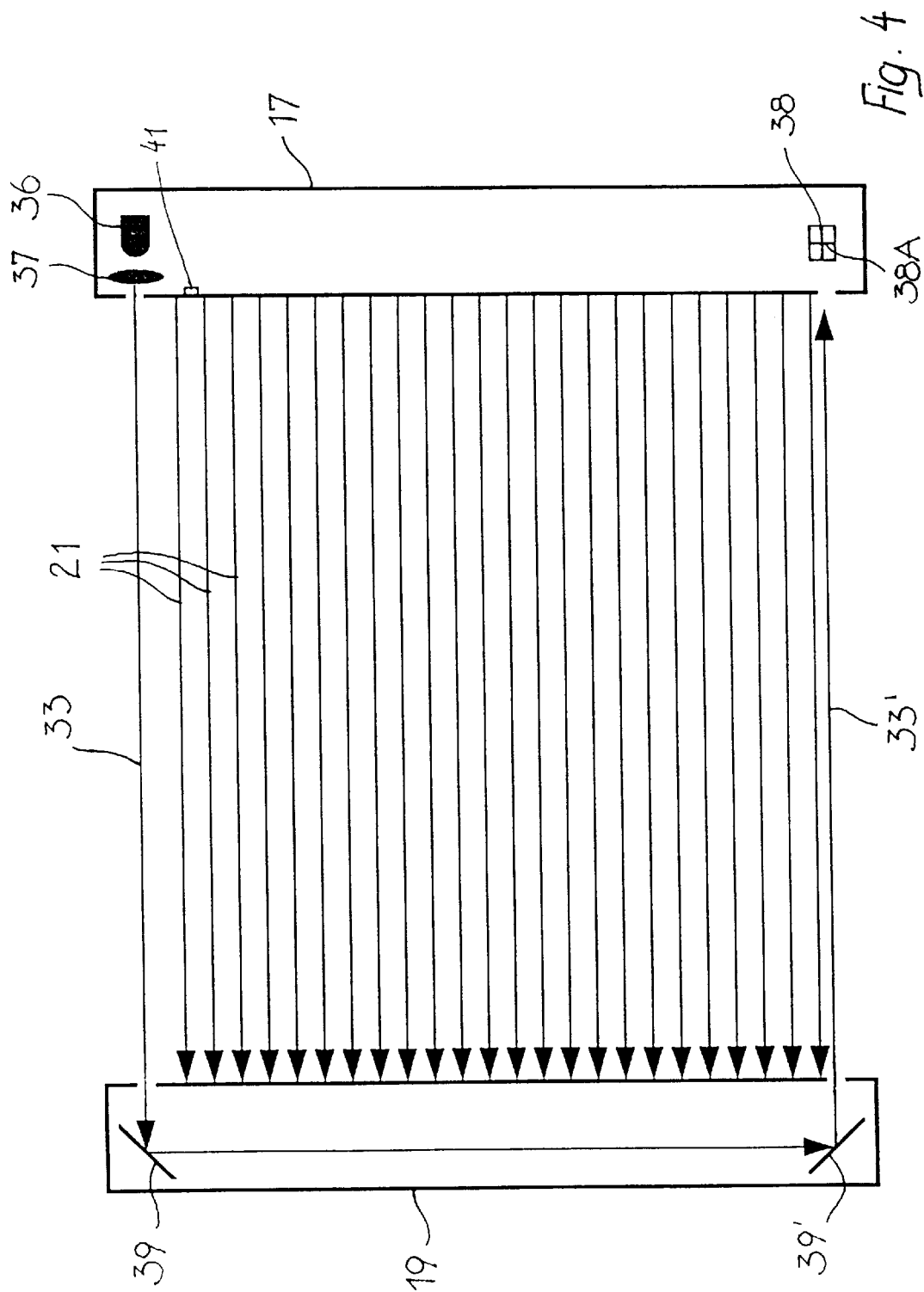
Figure 5:
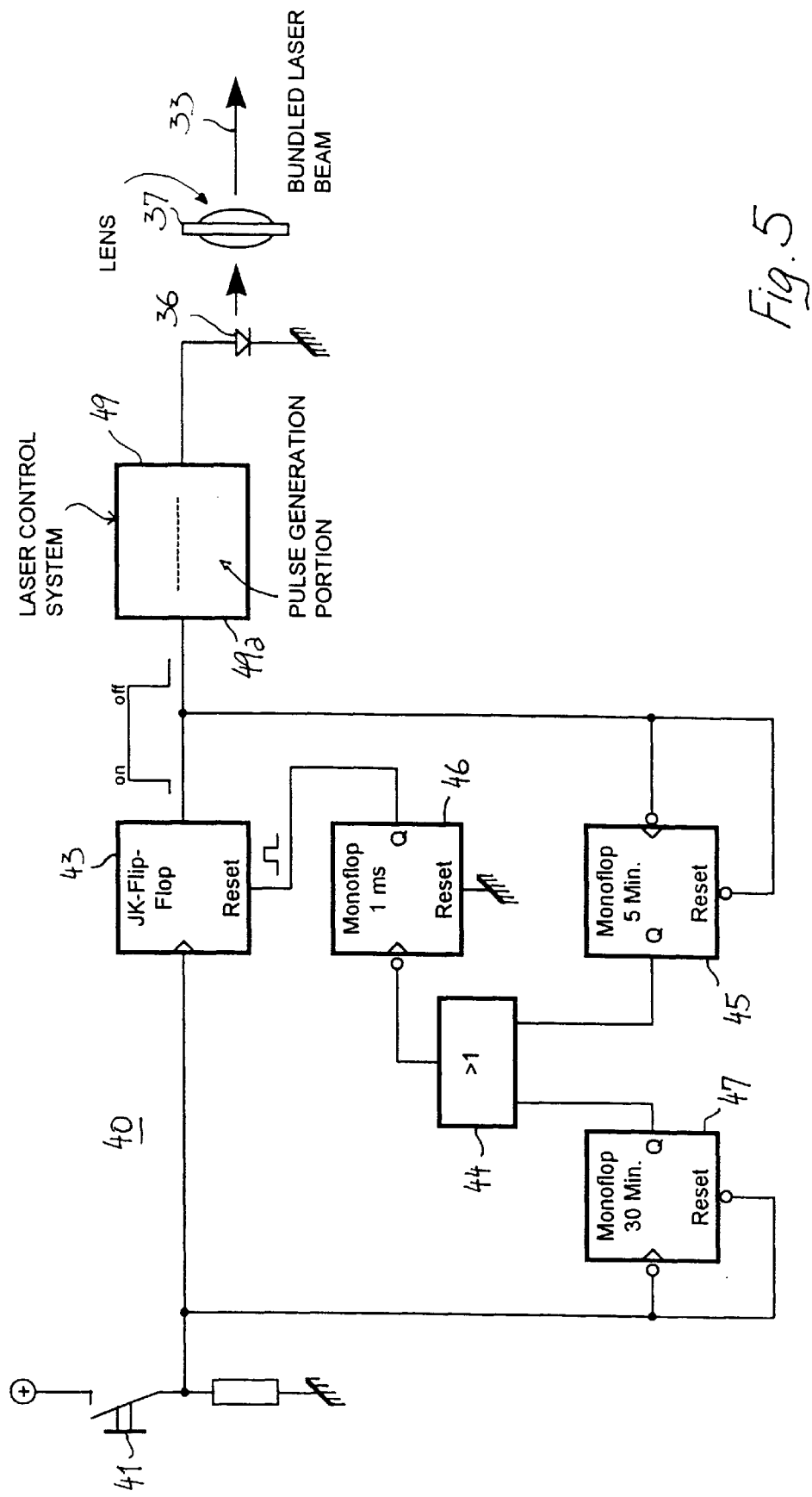
Figure 6:
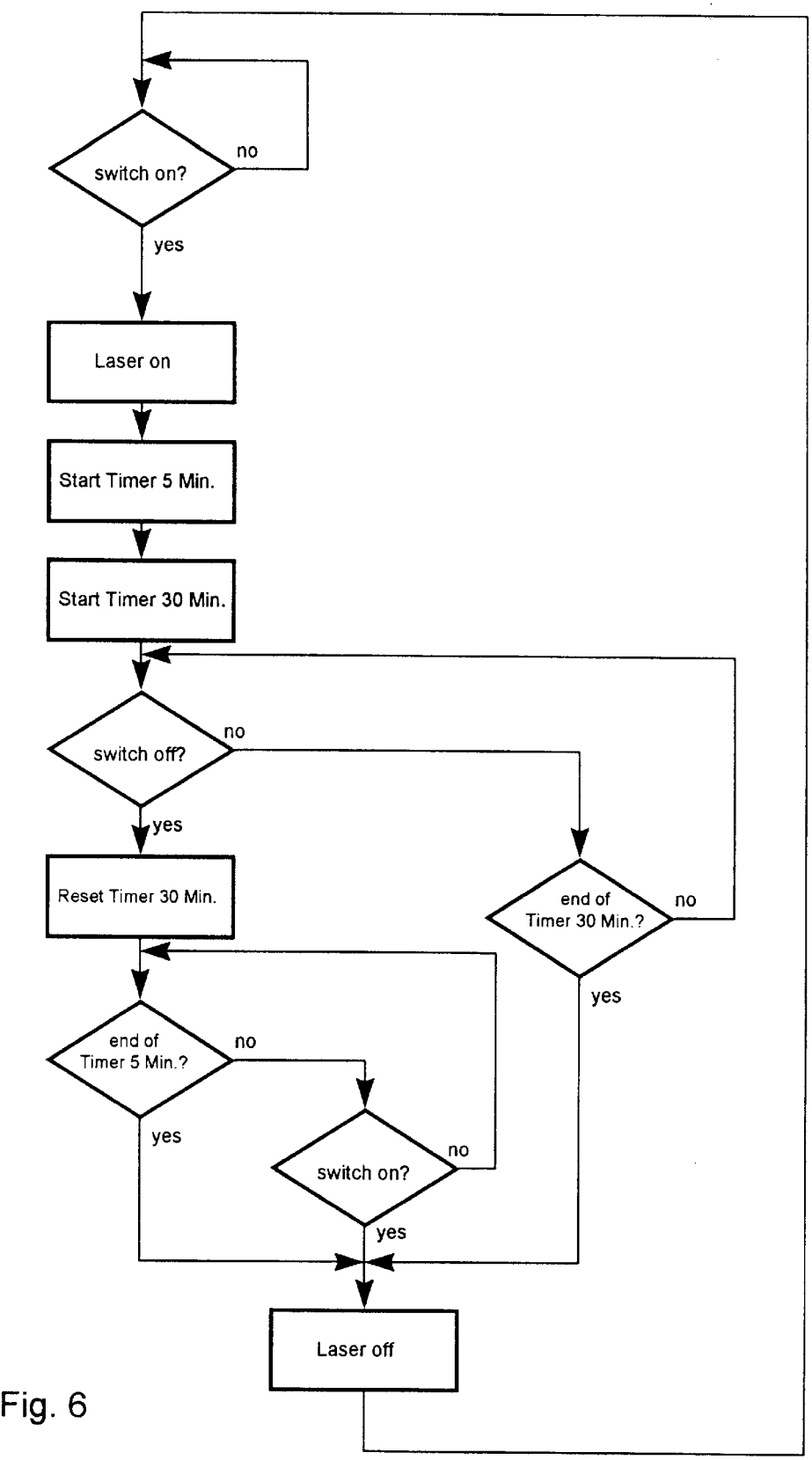
Figure 7:
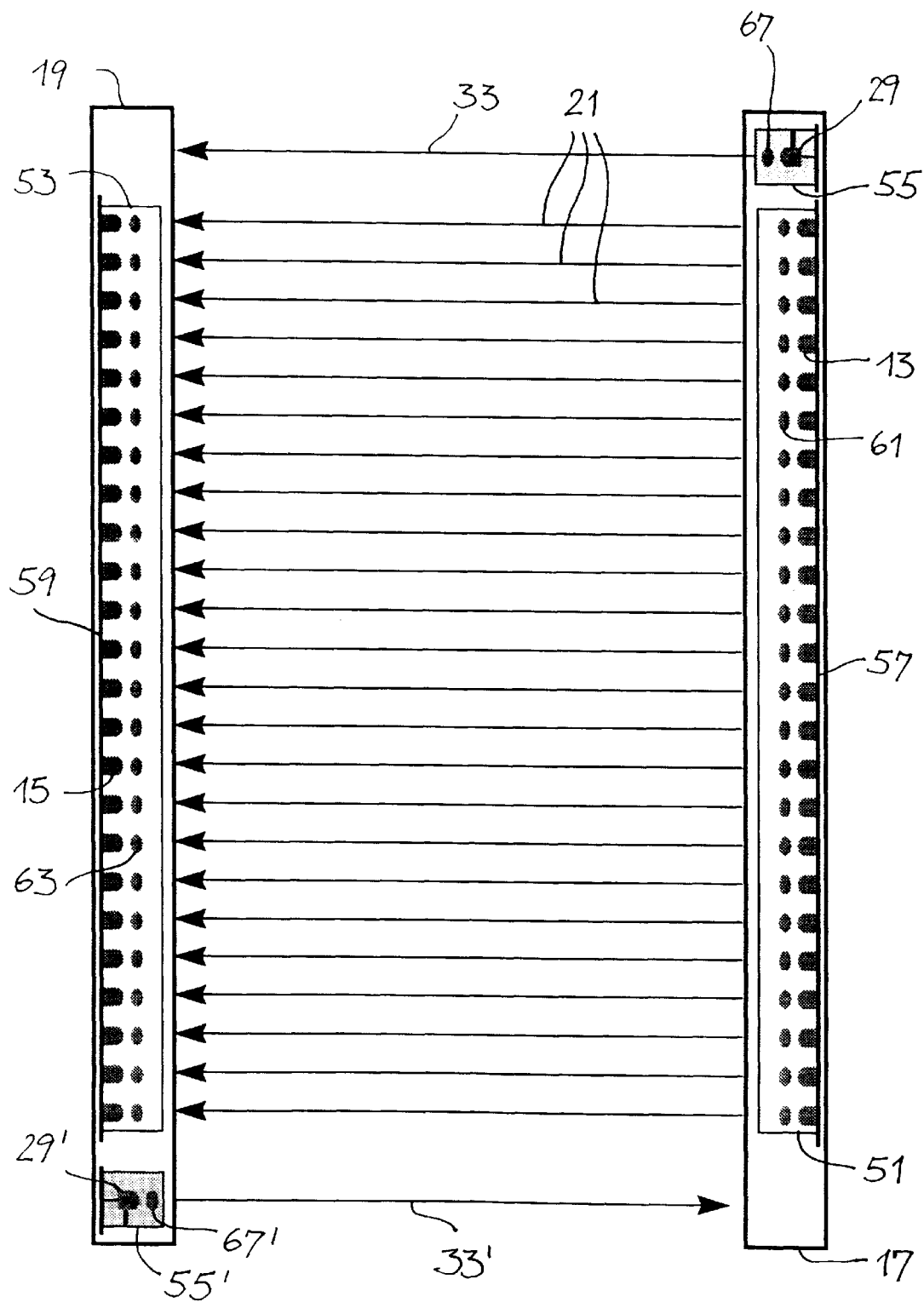
Figure 8:
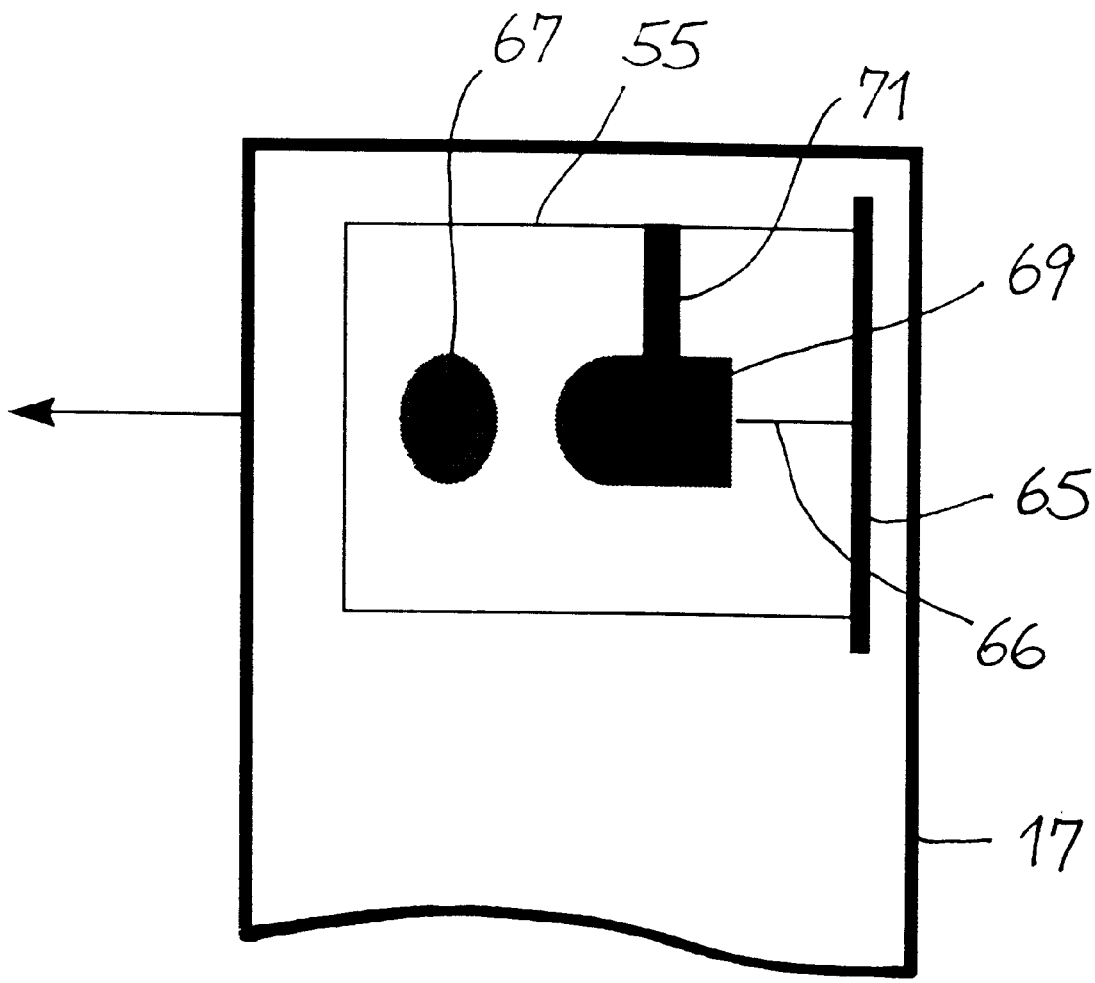

FIG. 3 a highly schematic view of another embodiment of an alignment system in accordance with the present invention, having two laser light sources on one bar, integrated in the respective transmitter and receiver bars, and omitting all elements not necessary for an understanding of the invention;

FIG. 4 a highly schematic view of a further embodiment of an alignment system in accordance with the present invention, having two laser light sources, integrated in the respective transmitter and receiver bars, and omitting all elements not necessary for an understanding of the invention;

FIG. 5 is a highly schematic block diagram of a control system for the light curtain alignment system;

FIG. 6 is a flow diagram of a program to control the alignment system;

FIG. 7 is a highly schematic vertical cross-sectional view through a light curtain having transmitter bars and receiver bars, and the alignment system integrated therewith in accordance with the present invention; and FIG. 8 is a highly schematic, fragmentary view of the alignment system of FIG. 7, illustrating the alignment receiver or transmitter, respectively, to an enlarged scale.

DETAILED DESCRIPTION

Figure 1:
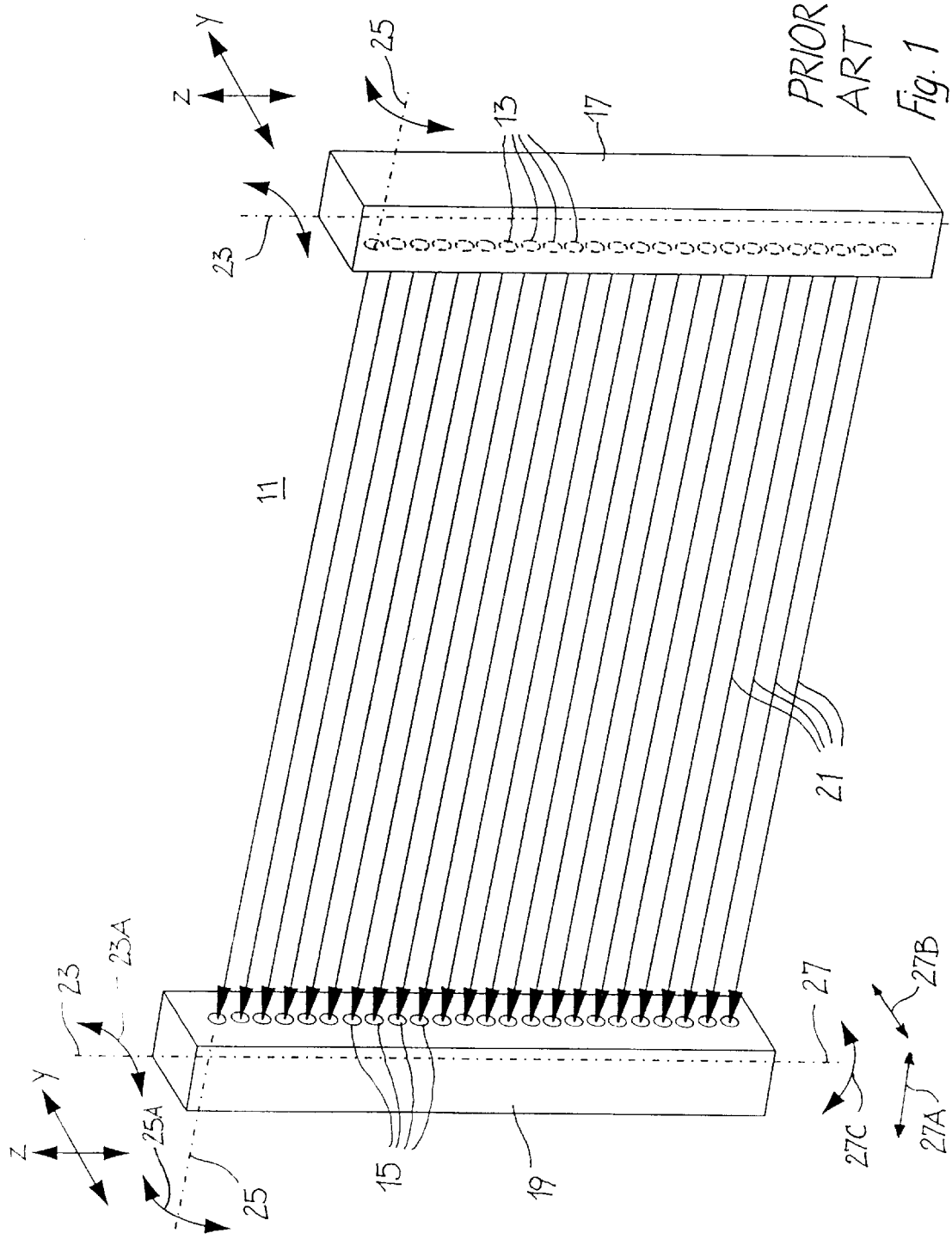
FIG. 1 is a highly schematic perspective view of a light curtain system of the prior art, which has two spaced oppositely located bars, each having a plurality of radiation transmitter/receiver pairs.

Referring first to FIG. 1: A light curtain 11 has a plurality of cooperating transmitters 13 and receivers 15. The transmitters 13 and receivers 15 are located in respectively uniform, or non-uniform spaces from each other, located on a respective transmitter bar 17 and a receiver bar 19. The bars 17, 19, for example, have rectangular cross-section. The transmitters transmit visible, or usually invisible, for example infrared radiation, to the receivers 15. If an object is located in the resulting radiation curtain between a transmitter 13 and a receiver 15, that is, if at least one of the light beams is interrupted, a suitable circuit, as well known, provides a switching signal which may be an alarm, a counting, or a defect signal, or the like.

For proper operation of the light curtain formed by all of the beams 21, each one of the receivers on the bar 19 must be within the radiation field, that is, the transmitted beam, which actually is a narrow cone, transmitted thereto by the cooperating transmitter 13; and each transmitter 13 must radiate its beam to impinge within the reception field of the cooperating receiver 15. This, in actual practice, is often difficult to achieve, since each one of the strips or bars 17, 19 has several degrees of freedom of movement, which must be so aligned that the above conditions for proper functioning of the system are met. When the transmitters transmit beams with only a very narrow beam spreading angle, for example for light curtains covering a substantial distance between the transmitter bars 17 and the receiver bars 19, exact alignment is particularly difficult. Such light curtains are used, typically, in safety applications. Light curtains of this type, for example, must also meet the international standard IEC/EN 61496.

Figure 2:
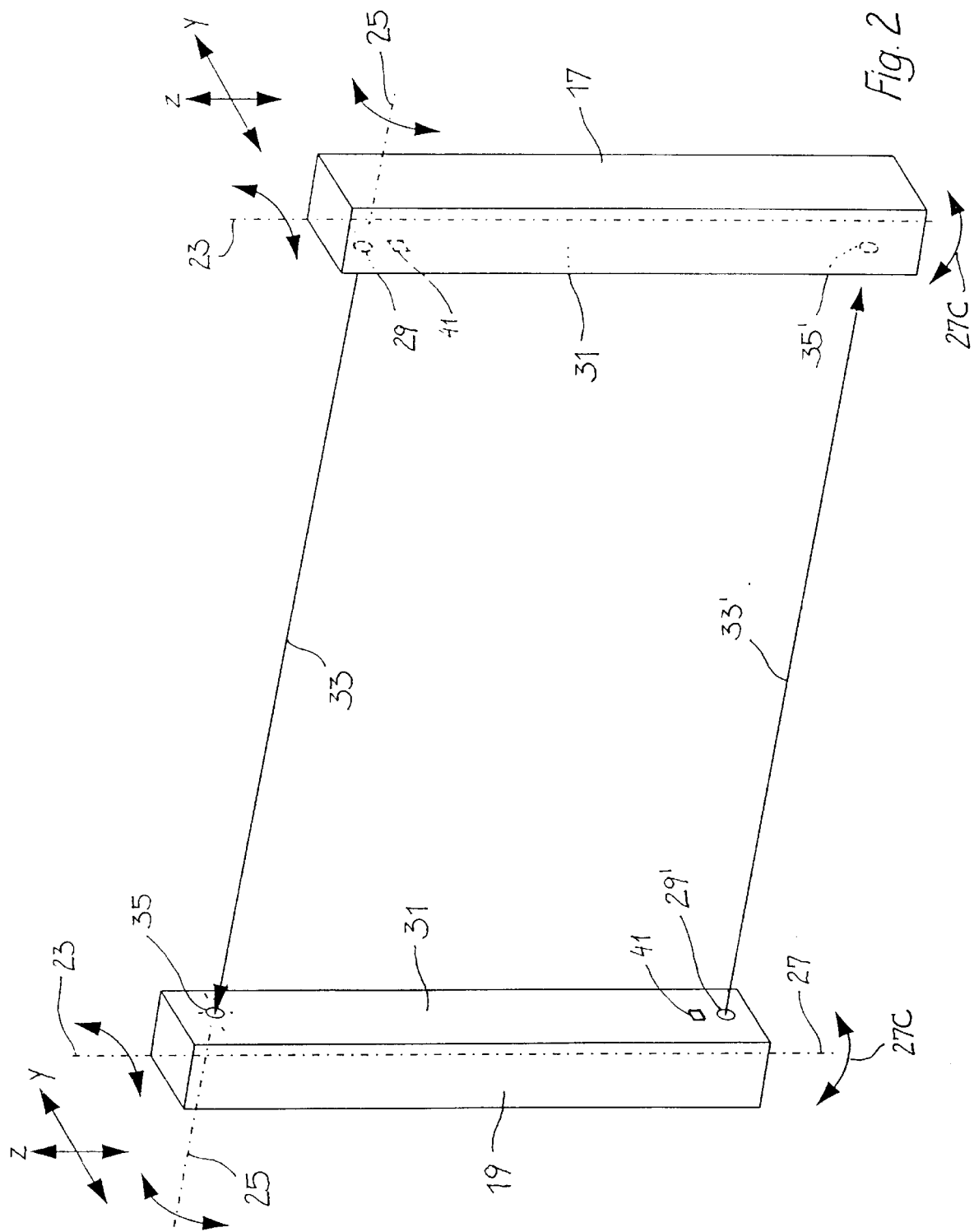
FIG. 2 is a highly schematic view of the first embodiment of an alignment system in accordance with the present invention, having two laser light sources, integrated in the respective transmitter and receiver bars, and omitting all elements not necessary for an understanding of the invention.

As clearly seen in FIG. 2, each one of the bars 17, 19 must first be aligned in the y- and z- direction. Adjustment must also be done with respect to the rotation axis 23, see arrow 23A.

This angle is also referred to as the yaw angle, and the axis 25, see arrow 25A, also known as the roll angle. In addition, each one of the bars must be perfectly perpendicular, that is, perfectly parallel or co-linear, with respect to the corresponding bar. Any deviation from a vertical, shown by line 27, is illustrated by the arrows 27A and 27B. Together, arrows 27A and 27B may be expressed by the single arrow 27C. Misalignment with respect to a vertical axis may occur in two directions. This misalignment can also be expressed as the tipping angle. As can be seen, each bar 17, 19 thus has five degrees of freedom of movement or, for purposes of a light curtain, possible misalignment.

Deviation from the ideal position with respect to any one of these angles interferes with proper and/or optimum operation of the light curtain, in that one or more of the receivers 15 will not receive maximum light intensity from the respective transmitter 13. In extreme cases, this may lead to failure of the light curtain. Failure can occur, for example, when the light curtain signals penetration of an object, although there is none, merely due to the misalignment; or, what is worse, does not detect presence of an object which has penetrated in the supervised field, also known as the guard zone.

In accordance with the present invention, and in which FIG. 2 illustrates one embodiment, an alignment assistance system is provided which has a respective light source 29, and 29' integrated in the transmitter strip 17 and the receiver strip 19, respectively. The alignment radiation sources 29, 29' are so arranged that, in operation, they generate a direct light beam 33 and a counter-directed beam 33', respectively, extending essentially perpendicularly to the facing surfaces 31 of the respective strips or bars 17, 19. The light beams 33, 33' are parallel to the optical axes of, respectively, the transmitted and received beams 21 forming the light curtain. The beams 21, as well as the transmitters 13 and receivers 15, have been omitted from FIG. 2 for clarity of the illustration. Each one of the bars 17, 19 has a reference marker, or a reference point 35, 35', on which the alignment radiation beams 33, 33' must impinge upon proper alignment of the bars 17, 19. It is clear to those skilled in the art that the bars 17, 19 usually have the same dimensions, and the reference points, and the cooperating alignment light sources are, then, on exactly the same positions located at respectively opposite bars 17, 19.

In the system illustrated in FIG. 2, alignment light source 29 and reference point 35 are at the upper end of the respective bars 17, 19; alignment light source 29' and reference point 35' are located at the lower ends of the respective strips 17, 19. By this arrangement of the alignment light sources 29, 29' and the alignment reference points 35, 35', which form receivers, two oppositely directed alignment radiation beams 33, 33' are generated, which permits the two bars 17, 19 to be appropriately aligned with respect to the above-referred to five degrees of freedom of movement.

In accordance with another feature of the present invention, and as illustrated in FIG. 3, the transmitter bar 17 has two light sources 29 and 29". The same reference numerals have been used as in FIG. 2, for simplicity. The additional, third alignment light source 29" is located at one of the ends of the bars 17, as shown at the lower end of the bar 17. The beam 33' transmitted by light source 29' is co-linear and, preferably coaxial to the beam 33" transmitted by the alignment light source 29", to impinge on the respective reference point. The advantage of this arrangement is that any twist or torsion along the longitudinal axis of the strip 17, that is, arrow 23A, and misalignment due to twist, arrow 27C, can be readily detected. Of course, both the bars 17 and 19 may have two alignment light sources, operating, respectively, in reverse direction, as shown in connection with the beams 33' and 33".

In accordance with the present invention, and as shown in FIG. 4, two bars 17,19 can be aligned utilizing only a single alignment source 29. A single laser diode 36 is located on bar 17. A lens 37 focuses the direct beam from laser diode 36 towards a 180° deflection system in the bar 19. As shown schematically, the deflection system in its simplest form, includes two mirrors or prisms 39, 39', which deflect the light beam 33 emanating from bar 17 back, by beam 33', to the bar 17, where the reflected, now counter-directed beam 33' is detected in a receiver 38. The deflection system 39, 39' is shown only schematically. The receiver 38 may include cross-hairs 38A. Alternatively, a marker could be placed on a geometrically defined position on the bar 17. This arrangement also permits adjustment with respect to all degrees of freedom of movement, and supervision of proper alignment with respect to these degrees of freedom of movement. For a practical application, the deflection elements, typically mirrors or prisms, one of which functions as a radiation receiver, should be aligned with an accuracy of less than 0.1° or better, since any possible misalignments of the deflection elements 39, 39' multiplies the misalignment by four.

FIG. 5 illustrates a circuit of a control unit 40 to control the alignment assistance system. A switch 41, which may be a touch switch, a key switch or other suitable switch, energizes the system; the system can control all the alignment radiation sources 29, 29', 29"; or, respectively, the switch can control radiation systems associated individually with one or more or all of the alignment radiation sources, or separate switches can be provided, as desired. The switch, preferably, is so arranged that upon one operation, the circuit is energized, to set a JK-flipflop 43. Flipflop 43 then energizes a laser control system 49. Integrated into the laser control system can be a pulsing generator 49a, so that the laser diode 36, controlled by the system 49, is operating in a pulsed mode. Such laser control systems, for continuous or pulsed operation, are well known, and commercial systems can be used. Operating switch 41 again resets the JK-flipflop and the laser diode 36 is disconnected.

A monostable, or monoflop circuit 45 is also SET by switch 41. The monoflop 45 has a time delay of, for example, about 5 minutes and, if an operator fails to disconnect the laser circuit 36 by use of switch 41, the monoflop 45, through the OR circuit 44 and monoflop 46, resets the JK-flipflop 43. The monoflop 46 has a time delay of about 1 millisecond. If the switch 41 is locked into an ON position, a second monoflop 47 is provided to disconnect the laser diode, at the most, after about 30 minutes.

The foregoing circuit substantially minimizes the loading of the laser diodes and simultaneously ensures that the laser diodes, as well as the photo emitters and LEDs used in the light curtain, need not be replaced during the expected lifetime of the system. The time delays based on general experience are sufficient to test and check the respective alignment of the two bars 17,19 by the alignment system in accordance with the present invention.

The laser control system 49 preferably includes the pulse generator portion 49a. This ensures that the alignment light beam generated by the laser 36 can be easily seen, also in daylight. A suitable pulse rate is, for example, about 2 Hz.

The control of the alignment system can also be done by software, with a suitable program, stored in a program carrier, for example on a semiconductor chip. The flow diagram of the program is shown in FIG. 6, which continuously, or in predetermined time intervals, checks if the switch 41 has been operated to energize the laser 36.

Upon operation of the switch 41, the laser is turned ON, and a first timer having a timing cycle of about 5 minutes, as well as a second timer with a timing cycle of about 30 minutes, are operated. Then, the program tests whether the switch 41 has been reset, or remains in the ON position. If the switch is in the OFF position, the second timer is reset and the program waits until the first timer has run down. In this holding loop, a test is made, simultaneously, if the switch has been operated again. If this is the case, the laser is disconnected before the 5 minutes have passed. If the switch is not operated, the laser is disconnected after 5 minutes.

If the switch is locked in the ON position, the program will remain in a holding loop in which it supervises when the time interval of the second timer, typically 30 minutes, have passed. As soon as the predetermined time of the second timer has passed, the laser is disconnected. Of course, the time intervals can be suitably varied. The above intervals have been found suitable from experience.

The respective hardware controls, or software controls ensure that the laser light source cannot remain in operation for an extended period of time but, at the most, after a second predetermined time limit, is disconnected. This also then, prevents that unauthorized third parties arrest the switch in the ON position, for example, due to vandalism, and that no damage to the laser light source may result.

FIG. 7 illustrates, highly schematically in a transparent front view, the modules 51, 53 which retain the transmitters and receivers 13, 15 of the light curtain, as well as the alignment light sources 29, 29' and the associated alignment receivers 35, 35'. Modules 55, 55' are located on the bars 17, 19. The transmitters 13 and receivers 15 are positioned on elongated base plates 57, 59, for example, by the well-known surface-mounted device (SMD) technology. They are soldered on the base plates 57, 59. Transmitters and receivers 13, 15 are so aligned that their optical axes extend perpendicularly to the base plates 57, 59. Lenses 61, 63 are located, spaced, in advance of the transmitters 13 and receivers 15, which, respectively, form narrow beams of the light transmitted by the transmitters and, respectively, focus the received lights on the receivers 15. Other elements, for example diaphragms, may be located between the lenses 61, 63 and the transmitters 13 and receivers 15, respectively, which limit the opening beam angle of emitted light curtain, or light screen radiation. The base plates 57, 59 are located in a suitable manner, for example between guide grooves or the like, on the bars 17, 19, which are suitably shaped for reception of the base plates 57, 59, as well known. The only requirement is that the base plates 57, 59 are properly located with respect to the bars 17, 19, at right angles, to have a predetermined defined relative position, and that the optical axes between the respective transmitters and receivers 13, 15 extend at right angles with respect to the bars 17, 19.

The light sources 29, 29', 29", formed by the laser diodes, are located on support plates 65, 65', respectively, which are again positioned in suitable guide arrangements, for example, grooves, formed in the profile of the strips or bars 17, 19. The laser diodes are soldered on the mounting plates 65, 65'. The connecting wires 66, schematically shown in FIG. 8, permit alignment of the laser diodes in all directions. For perfect alignment, adjusting screws 69, 71 (FIG. 8) are provided, so that the laser diodes can already be positioned in the factory on the bars 17, 19, in the Y-Z plane (FIG. 2). Thus, the optical axes of the laser diodes and the plane defined by the beams 21 will extend parallel to each other. A focussing lens 67, 67' is provided in advance of the light sources 29, 29', to focus the emitted light into a narrow beam, so that on the receive bar 19 only a narrow light spot between about 2 and 8 mm diameter will be visible when the bar 19 is mounted in position, spaced from bar 17 by the distance required by the light screen or light curtain formed by the beams 21, and the size of the required guard zone.

When making the light curtains, the transmitter and receiver modules 51, 53, as well as the laser modules 55, 55', are aligned with respect to reference markers, not shown in FIG. 7 and FIG. 8, applied to the bars 17, 19 to permit alignment of the laser diodes. The laser diodes are so aligned that the beams extend parallel to and in the plane of the beams 21, which form the light curtain or light screen. This has the advantage that when placing a light curtain, and operating the light curtain, or subsequent later supervision and adjustment and testing for alignment, the test or readjustment of the two bars 17, 19 can be done rapidly, while the bars are in position, that is, by so adjusting the bars that the alignment light beams emitted by the laser diodes are aligned with respect to the reference markers or the receivers 35, 35'. The bars, of course, include the respective mounting plates or modules on which the transmitter 13, receiver 15, light source 29 and reference markers 35 are, respectively, located. The reference markers 35 may also include crosshairs or the like. The light sources 29 and the reference markers, together with the transmitters and receivers 13, 15, can be located separately, or on a common support plate to permit rapid adjustment of the mounting plates or support plates, as above described.

Alignment of two oppositely spaced bars with transmitters and receivers can be made quickly and reliably when using the method of the present invention, using two alignment beams projected in opposite directions. First, the position of the bars 17, 19 is aligned with respect to the z- and y- directions. This can easily be done by locating suitable elongated holes, or inclined holes, on the bars 17, 19. Thereafter, the bars can be aligned with respect to the axes 23, 25, 27 by suitable adjustment elements, for example screws, shims or the like, as well known.

The optical axes of the transmitter 13 and the receiver 15 are prealigned on the respective bars already at the factory manufacturing the light screen. This ensures that the transmitter and receiver beams, or beam sensitivity is already properly defined with respect to the bars 17 and 19, that is, precisely at right angles to the facing surfaces 31 of the bars 17, 19. Likewise, the alignment beams 33, 33' of the laser light sources 29, 29', are already aligned to extend at right angles to the facing surfaces 31 of the bars 17, 19 at the factory. Thus, the alignment beams 33, 33' will then extend parallel to the light curtain or light screen beams 21, and, likewise, the reception areas and zones of the respective receivers. The light sources and reference point will have a precisely defined position with respect to the transmitter or receiver elements, so that by alignment of the respective bars 17, 19, which thus also aligns the alignment beams 33, 33', to and on the reference points 35, 35', the light curtain or light screen transmitter-receiver pairs are optimally adjusted in position.

The above-described alignment system can be used to adjust and align any electrical or optoelectronic detection devices, and is particularly suitable for light curtains or light screens; it can be used, also, for example for reflected light switches, or light curtains, or light gates, which work with respectively cooperating transmitters and receivers. The transmitters and receivers can be spaced on the respective bars or support plates in uniform spacing, but this is not required; they may be spaced irregularly with respect to each other, and effective testing beams can be arranged to be between different transmitter/receiver pairs. Preferably, the light sources for the alignment system use pulsed lasers operating in the visible range, for example of visible light of 635 nm, or 670 nm. Other light sources, which permit forming of precisely defined beams of radiation may be used, if they have a sufficient radiation power. Preferably, the alignment system is integrated in the structure of the entire light curtain or light screen. It is also possible to form a light curtain of a plurality of bars, like bars 17 or 19; in such case, each bar, preferably, has an alignment system in accordance with the present invention, integrated therewith.

Various changes and modifications may be made, and any features described herein may be used with any of the others, within the scope of the inventive concept.

I claim:

1. A method of geometric alignment of two spaced light curtain support elements, optionally support bars (17, 19) defining, respectively, a radiation transmitting support element (17) and a radiation receiving support element (19), a plurality of radiation transmitters (13) supported on the radiation transmitting support element, and a plurality of radiation receivers (15) supported on the radiation receiving support element (19), wherein the radiation from the transmitters (13) is directed towards the radiation receivers (15);

and comprising, in accordance with the invention, the steps of generating two respectively counter-directed alignment radiation beams (33, 33') between said radiation transmitting support element (17) and said radiation receiving support element (19), whereby the respective radiation transmitting and radiation receiving functions of said support elements are reversed with respect to one of said counter-directed beams; and detecting each of said directly transmitted and counter-directed alignment radiation beams by respective radiation alignment detectors (35, 35'), respectively located on said radiation transmitting support element (17) and on said radiation receiving support element (19), for optimal alignment of said support elements (17, 19), with respect to each other.

2. The method of claim 1, including the step of aligning said radiation transmitters (13) and an alignment radiation transmitter (29) on said radiation transmitting support element (17) for co-linear position on the respective support element;

aligning said radiation receivers (15) and aligning a counter-directed alignment beam transmitter (29') on said radiation receiving support element (19) for co-linear reception of radiation, and further aligning a further counter-directed alignment beam receiver (35) on one (19) of said support elements (17, 19), and a counter-directed alignment beam receiver (35') on the other (17) of said support elements (17, 19) for simultaneously aligning the positions of the respectively cooperating radiation transmitting and receiver pairs (13, 15), as well as the corresponding alignment radiation transmitters (29, 29') and alignment radiation receiver (35, 35') pairs.

3. The method of claim 1, further including the step of receiving on one (19) of said support elements the alignment radiation beam; and deflecting said received alignment radiation beam by 180°, and retransmitting said received alignment radiation beam in a direction counter to the receiving direction, from a location spaced from the reception of said beam, back to said one (17) support element, whereby one alignment radiation beam transmitter (29) will generate the radiation for both of said alignment radiation beam and said counter-directed alignment radiation beams.

4. The method of claim 1, further including the step of generating a third alignment radiation beam (33"), whereby at least one alignment radiation beam (33') will be counter-directed with respect to two other alignment radiation beams (33,33"), said third alignment radiation beam (33"), optionally, being approximately coaxial with respect to one (33') of said other alignment beams (33, 33').

5. The method of claim 1, wherein said alignment step comprises projecting, first, a first alignment beam (33) from a first alignment radiation transmitter (29) on a corresponding alignment radiation receiver or detector (35), and aligning said support elements (17,19) for maximum reception of said alignment beam; and projecting the counter-directed alignment radiation beam (33) from the alignment radiation transmitter on the other support element, with respect to the corresponding radiation receiver (35') on the first support element (17) for maximum reception of the second, counter-directed alignment beam; and repeating the above two steps until both alignment radiation beams (33, 33') from the respective alignment radiation transmitter (29, 29') are precisely aimed to the corresponding alignment radiation receiver (35, 35').

6. The method of claim 1, including the step of generating said alignment radiation beams (33, 33', 33") simultaneously, and then adjusting the position of both said radiation support elements (17, 19) for maximum radiation reception of the alignment radiation beams.

7. The method of claim 1, including the step of energizing alignment radiation transmitters (29, 29', 29") to generate said alignment radiation beams (33, 33', 33") for a predetermined first time interval, and then automatically disconnecting energization of said alignment radiation transmitter after a lapse of said time period.

8. The method of claim 7, further including an energization switch (41) for said alignment radiation transmitters (29, 29', 29");

establishing a disconnect time interval; and deenergizing said alignment radiation transmitters (29, 29', 29") after elapse of said time interval, regardless of the position of said switch (41).

9. A light curtain, or light gate, comprising at least two spaced light curtain support elements (17, 19), defining, respectively, a radiation transmitting support element (17) and a radiation receiving support element (19);

a plurality of radiation transmitters (13) supported on said radiation transmitting support element (17);

a plurality of radiation receivers (15) supported on said radiation receiving support element (19), the radiation from said transmitters (13) being directed to the radiation receivers (15) to establish, between said transmitters and receivers, a guard zone covered by radiation between said transmitters and receivers on said respective support elements;

and further comprising, in accordance with the invention, a first alignment radiation transmitter (29) located on one (17) of said support elements (17, 19) and generating a first alignment radiation beam (33);

means for generating a counter-directed alignment radiation beam (33') located on the other (19) of said support elements (17, 19), said counter-directed radiation beam being emitted from said other support element at a location spaced from an impingement point (35) of said transmitted alignment radiation beam (33); and an alignment radiation receiver (35, 35') on said one (17) radiation transmitting support element and receiving said counter-directed radiation beam (33').

10. A light curtain, or light gate according to claim 9, wherein said means for generating said alignment radiation beam from the second strip comprises at least one of a second radiation transmitter (29') located on said other (19) support element at a position spaced from the impingement point of said alignment beam (33) generated by said first alignment radiation transmitter, and generating a counter-directed alignment radiation beam (33'), directed towards said one support element (17); and 180° deflection means, optionally mirror or prisms, located on said other (19) support element, receiving said alignment radiation beam (33), deflecting and redirecting said beam in counter-direction, to provide said counter-directed alignment radiation beam (33'), for impingement on said one support element (17).

11. A light curtain, or light gate according to claim 9, wherein said alignment radiation transmitter (29,29') comprises a laser operating in the visible spectral region;

alignment radiation detectors (35,35') are provided, located on said support elements (17,19), positioned for receiving and detecting the alignment radiation beam transmitted from the alignment radiation transmitter (29, 29'); and wherein said radiation detectors include marking means, optionally cross-hairs (38A) or electromagnetic radiation-sensitive elements.

12. A light curtain, or light gate according to claim 9, further including a manually operable switching element (14) for energizing said alignment radiation transmitter, or transmitters (13, 13'), located on at least one (17) of said support elements.

13. A light curtain, or light gate according to claim 9, wherein said radiation transmitter or transmitters (29, 29', 29") are integrated on the respective one of said support elements (17, 19), and electrical switch means are provided for energizing one, or optionally a plurality, of said radiation transmitters (29, 29', 29").

14. A light curtain, or light gate according to claim 9, wherein in one (17) of said support elements, at least two alignment radiation transmitters (29, 29") are located, integrated on the respective support element;

and wherein on the other (19) of said support elements, at least one alignment radiation transmitter is located, said radiation transmitters being integrated on the respective support element.

15. A light curtain, or light gate according to claim 1, wherein said alignment radiation transmitters comprise at least one laser (36) and wherein at least one control unit (40) is provided for controlling said laser or lasers (36), said control unit including a pulse generating portion (49a), for intermittently pulsing the respective laser.

16. A light curtain, or light gate according to claim 15, wherein said control unit (40) comprises a first timing circuit (45) which, after energization of said lasers, provides a timing interval for alignment of said support elements (17, 19) and, after elapse of said timing interval, automatically disconnects said lasers from an energization source.

17. A light curtain, or light gate according to claim 16, further including a second timing element (47) disconnecting said energization source for said lasers after a second timing interval, longer than said first timing interval, regardless of the position of a connecting switch (41).

* * * * *